(12) United States Patent
Hays et al.

(10) Patent No.: US 7,093,503 B1
(45) Date of Patent: Aug. 22, 2006

(54) VARIABLE PHASE TURBINE

(75) Inventors: Lance G. Hays, Tustin, CA (US);
Dicran Sahabian, Los Angeles, CA (US)

(73) Assignee: Energent Corporation, Santa Ana, CA (US)

( * ) Notice: Subject to any disclaimer, the term of this patent is extended or adjusted under 35 U.S.C. 154(b) by 0 days.

(21) Appl. No.: 10/989,851

(22) Filed: Nov. 16, 2004

(51) Int. Cl.
*G01F 1/05* (2006.01)
(52) U.S. Cl. .................................. 73/861.79
(58) Field of Classification Search ............. 73/861.87, 73/861.79, 861.88; 416/1; 60/779
See application file for complete search history.

(56) References Cited

U.S. PATENT DOCUMENTS

| | | | | |
|---|---|---|---|---|
| 4,534,227 A | * | 8/1985 | Petit | 73/861.87 |
| 5,525,034 A | * | 6/1996 | Hays | 415/80 |
| 6,675,583 B1 | * | 1/2004 | Willis et al. | 60/779 |
| 6,682,302 B1 | * | 1/2004 | Noble | 416/1 |

* cited by examiner

*Primary Examiner*—Jewel V. Thompson
(74) *Attorney, Agent, or Firm*—William W. Haefliger

(57) ABSTRACT

An axial flow turbine configured to accept different nozzles which are respectively compatible with different fluids (gas, liquid or mixture thereof). The turbine is compatible with different rotating loads, which can be cooled or lubricated using liquid derived from the fluid.

25 Claims, 4 Drawing Sheets

VARIABLE PHASE TURBINE

BACKGROUND OF THE INVENTION

This invention relates generally to fluid driven turbines, and more particularly to what are described herein as variable phase fluid driven turbines.

Turbines are widely used in industry to convert the energy in liquid streams or gas streams to shaft power. Less common, but also used are turbines to convert the energy in two-phase (gas and liquid) streams to shaft power. The turbines for each type of stream are unique to that stream. That is, a turbine designed to be gas driven is not readily usable for liquid or two-phase flow. For example attempts to use radial inflow gas turbines for two-phase flow have resulted in poor performance and damage because the direction of centrifugal body forces is such as to throw liquid backwards into the nozzle blades.

Certain application for turbines require the use of different types of fluid streams for differing conditions. For example, a low temperature geothermal power system may require use of a gas stream or a two-phase flow stream, depending upon the temperature and working fluid used in the power producing cycle. To provide an efficient power conversion system, a new or specialized turbine must be designed, manufactured and qualified for each application. This is costly and time consuming and reduces flexibility, if the thermal characteristics of a given application change with time. There is need for an efficient turbine that can be driven by gas, or liquid or two-phase fluid flow.

SUMMARY OF THE INVENTION

It is a major object of the invention to provide a solution to the above described problems, and need.

An object of the present invention is to provide a turbine that can be used for either gas, liquid or two-phase flow, with minor adjustments to a component part, and known herein as the Variable Phase Turbine. As will be seen, such minor adjustments, typically concern nozzle insert and blade adjustments.

A further object is provision of a turbine and electric generator assembly that can be used for either gas, liquid or two-phase flow, and that requires no external seals, known herein as the Variable Phase Turbine Generator Assembly.

An additional object is provision of a turbine, electric generator and pump assembly that can be used for either gas, liquid or two-phase flow with no external seals, known as the Variable Phase Turbine Generator Assembly (VPTRA).

Yet another objective is provision of a power system, incorporating the Variable Phase Turbine Generator Assembly which generates power from heat sources.

A further objective is provision of a power system incorporating the Variable Phase Turbine Generator Assembly to generate power from a stream of gas, liquid or two-phase flow which has received heat from a heat source in a predominately liquid heat exchanger.

Another object is provision of a power system incorporating the Variable Phase Turbine Generator Assembly to generate power from a stream of gas, liquid or two-phase flow which has received heat from a geothermal fluid in a predominately liquid heat exchanger.

Yet another object is provision of rotary machinery comprising a) an axial flow turbine having nozzle means to receive first fluid flow along a first path to drive turbine blades for rotating a shaft, said path having a first exit, b) a driven structure rotatable by said shaft and having bearings, c) pump means associated with the driven structure to effect second fluid flow along a second path having a second exit, for lubricating the bearings, the second path disjunct from the first path, d) said nozzle means including at least two selectable nozzle configurations, for respectively receiving said first flow in the form of at least two of the following:
  i) gas
  ii) liquid
  iii) a gas and liquid mixture, e) a selected one of such nozzle configurations installed at the turbine.

As will be seen, the nozzle configurations are selected from the following groups:

$x_1$) a first nozzle having a relatively long flow contour section diverging lengthwise away from a throat, and a perforated fluid distribution plate upstream of the throat, $x_2$) a relatively short flow contour section lengthwise away from a throat, and an inlet section of relatively large area, $x_3$) a relatively short flow contour convergent lengthwise away from a throat.

Also, the driven structure typically comprises one of the following:

$x_1$) an electrical generator adjacent said second path, for cooling, $x_2$) other power means.

A further object is to provide the electrical generator adjacent to, or proximate to, the turbine, with a seal for sealing off between the first and second flow paths. The generator and turbine typically share the same shaft.

An added object is to utilize geo-thermal fluid that is cooled by the first fluid in a heat exchanger, before supply to the first path.

A yet further object is to provide a condenser receiving the first fluid in vapor state, for condensing the first fluid to liquid state, said first fluid then flowing to the second path in the form of the second fluid.

These and other objects and advantages of the invention, as well as the details of an illustrative embodiment, will be more fully understood from the following specification and drawings, in which:

DRAWING DESCRIPTION

DETAILED DESCRIPTION

Figure 1:
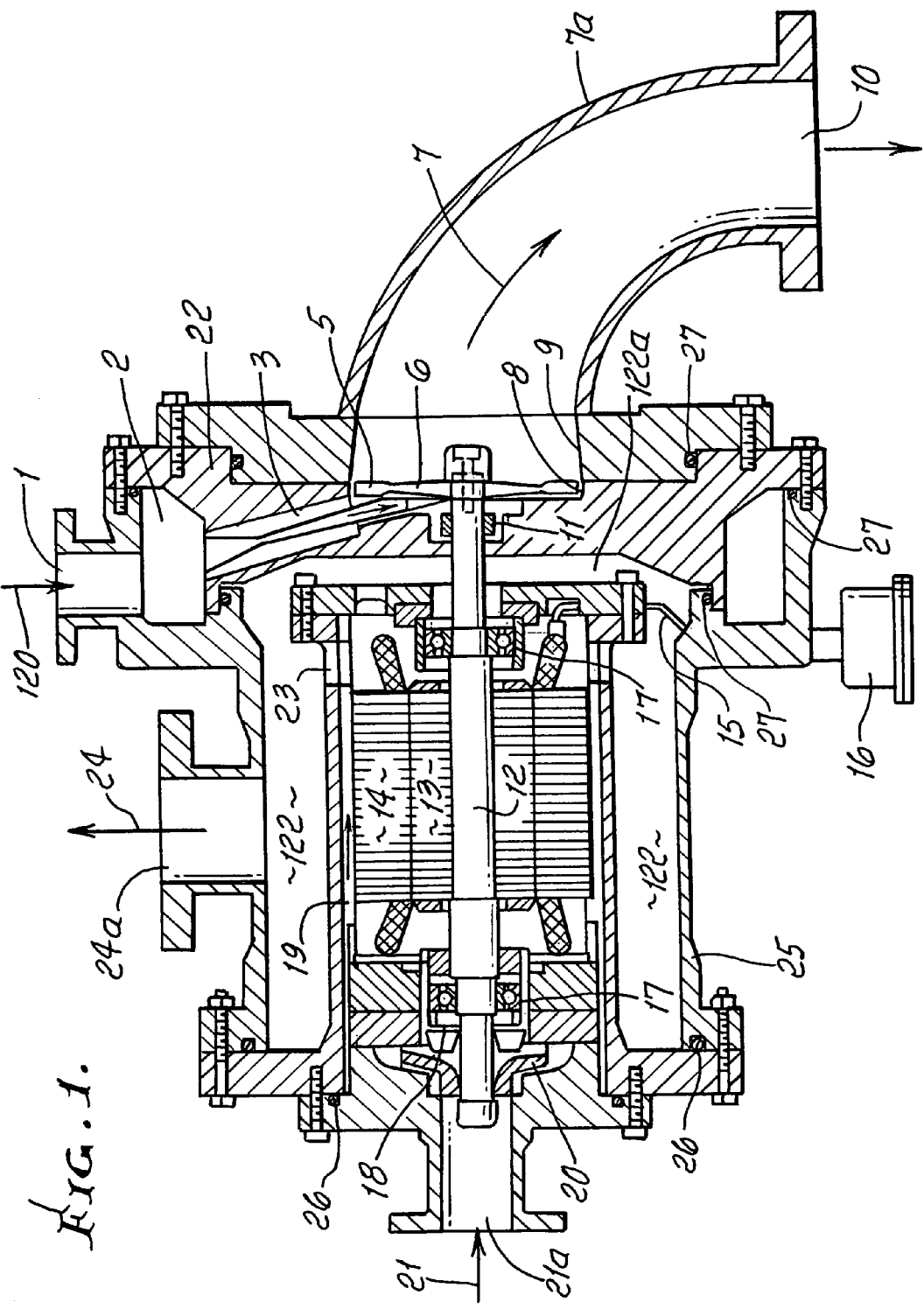
FIG. 1 shows a preferred turbo-generator.

Referring to FIG. 1, gas, liquid or a mixture of the two (collectively and individually hereafter referred to as "fluid") is introduced at 120 to the VPTRA through an inlet 1. The fluid is collected in a manifold 2, and flows to a multiplicity of nozzle inserts 3, which are easily replaceable. The nozzle inserts are arranged in a holder 22, to direct the fluid in a generally tangential direction towards rotor blades 5. The rotor 6 is carried by a rotatably driven shaft 12.

The fluid is expanded from the inlet pressure to a lower pressure in the nozzle inserts, producing a jet having kinetic energy. The jet is impinged upon impulse blades 5, which act to reverse the direction of flow, producing force on the blades. The blades are attached to rotor 6, and are easily replaceable. The blades transmit the force to the rotor producing a torque on the shaft 12 causing rotation.

The rotation drives an electric rotor piece 13 which is attached to the shaft, producing generated electric current in the electric stator 14. The current produced is conducted by wires 15 through a sealed and insulated connection to a junction box 16, for external delivery.

The fluid leaves the blades to flow at 7 in a generally axial direction with respect to duct 7a, typically with some swirl remaining. A continuous, generally annular shroud 8 is attached to outer extents of the blades to collect any centrifuged liquid, as for example where the fluid consists of liquid, or a liquid and gas mixture, and to minimize blade to blade leakage losses and windage losses.

Liquid collected on the shroud leaves the shroud with a small swirl that causes it to flow to and collect on the wall 9 of the end plate, ensuring that it leaves the area of the rotating blades without impinging on the blades or shroud which would produce frictional losses. Any liquid on the wall and gas leave the VPTRA through outlet 10, of duct 7a.

Fluid 21 in liquid state is introduced to the VPTRA through another inlet 21a. The pressure is increased by a pump 20 attached to the shaft 12. An impeller 20 on shaft 12 increases the pressure of fluid 21 above that at the inlet, causing the fluid to flow to zone 18, and lubricate the bearings 17. The fluid leaving the pump also flows to zone 19 adjacent outer extent of the stator, and cools the electric stator 14, and rotor 13.

After cooling the electric parts and lubricating the bearing parts, the fluid flows through a passage 23, and leaves the structure at 24 through an outlet 24a after reception in plenum zone 122, and end zone 122a, to cool structure and lubricate the bearing 17 closest to rotor 6. An internal seal 11 on shaft 12 isolates the cooling liquid 21 from the fluid 120 flowing in the rotor area, i.e. the flow paths of the two fluids are disjunct. The casing 25 encloses the parts of the VPTRA and has only static seals at 26 and 27 to contain the fluid. No external rotating seals are required, greatly increasing reliability and useful operating life.

Figure 2:
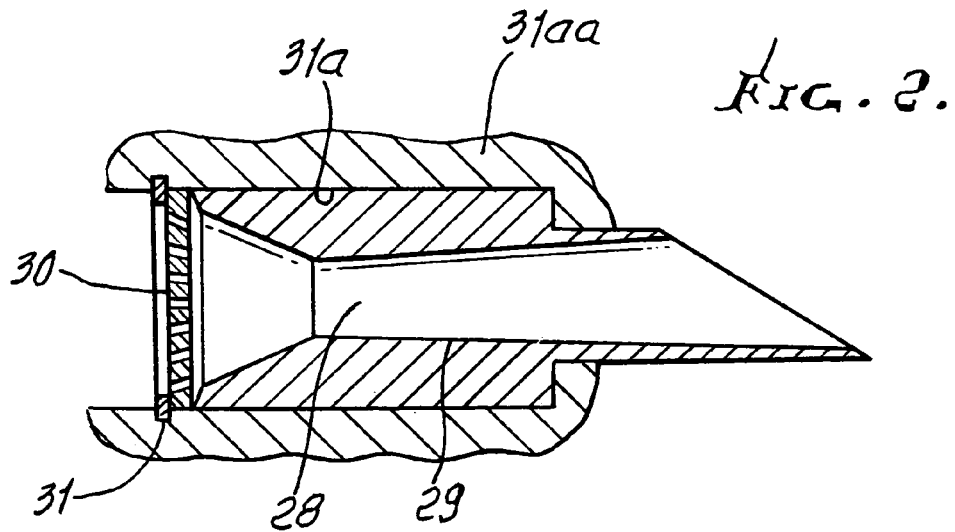
FIGS. 2–5 shows nozzle configurations.
Figure 3:
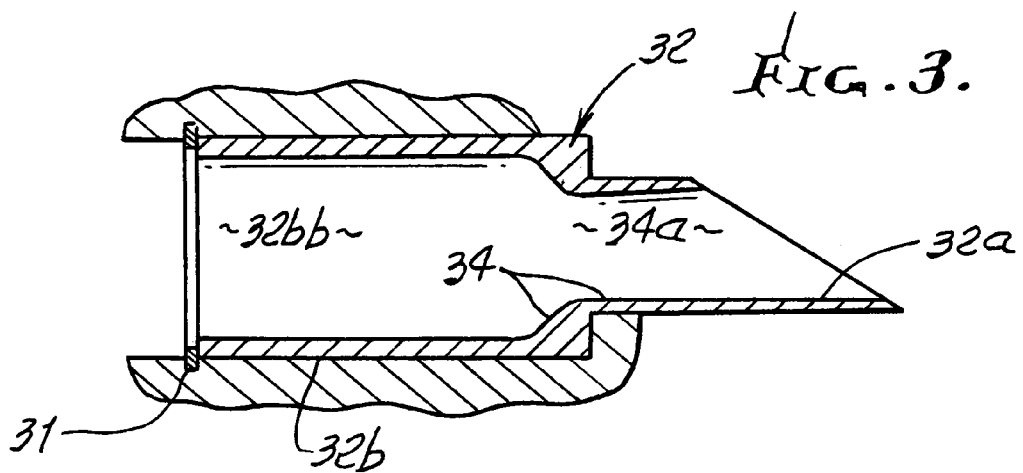
Figure 4:
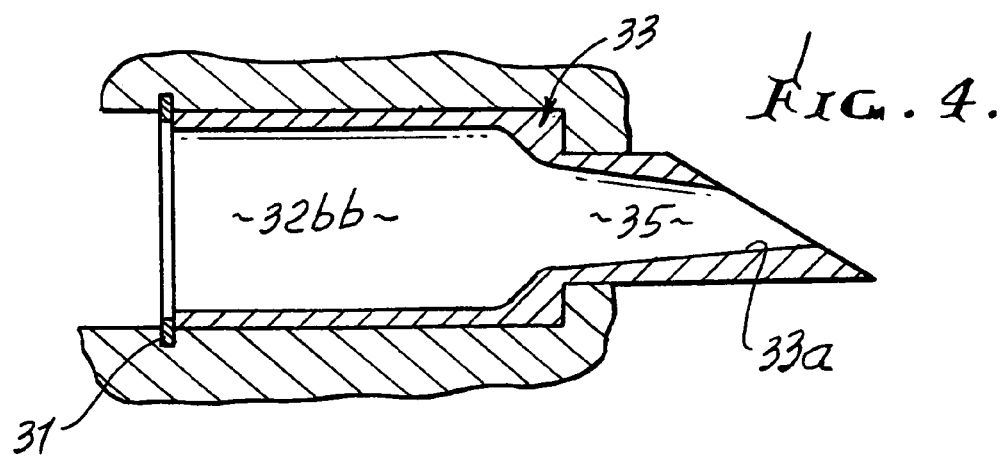

As shown in FIGS. 2–4 the replaceable nozzles consist of three general types. A nozzle insert for a mixture of liquid and gas 28 in FIG. 2, has a generally long contour 29 to enable the expanding gas to efficiently transfer energy to the liquid droplets. A gradual pressure gradient and expansion rate is required to avoid excessive slip between the gas and liquid. A distribution plate 30 having a multitude of smaller holes is provided to enable uniform distribution of the liquid and gas at the inlet to the nozzle. The distribution plate and nozzle insert can be fixed or removably held in place by an easily removable snap ring 31, holding the nozzle in bore 31a of structure 31aa.

A nozzle insert 32 in FIG. 3 for gas fluid has a generally shorter contour 32a to provide expansion of the gas in a shorter distance to reduce the wall friction. As shown it may have a convergent-divergent passage 34 with a throat 34a to provide supersonic flow velocity at the exit. An inlet section 32b having a larger flow area 32bb is provided to transport the gas to the inlet of the nozzle contour with low losses.

A nozzle insert 33 in FIG. 4 for a liquid fluid also has a generally shorter contour 33a, to reduce the wall friction. A convergent exit passage 35 with a generally smaller and decreasing diameter is provided to accelerate the liquid fluid to a high velocity.

Figure 5:
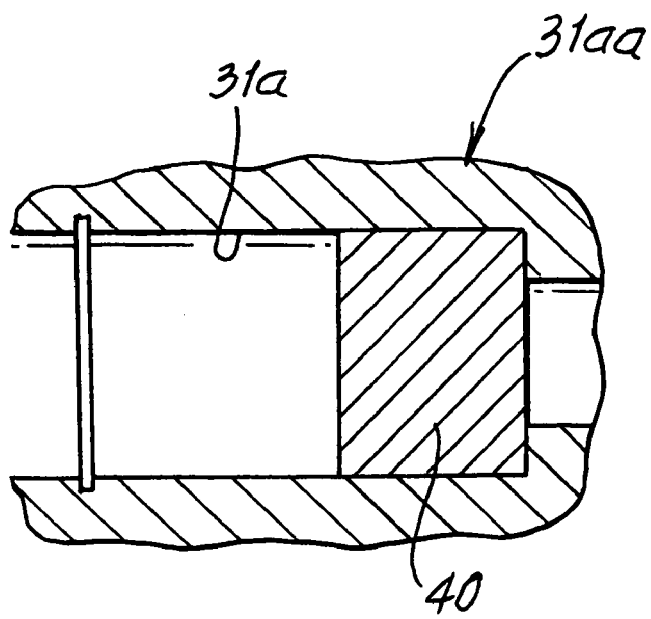

In all cases, solid inserts can be provided to block individual passages of clustered nozzles when low flow rates of the fluid are to be used. See for example FIG. 5, with solid insert 40 received in bore 31a.

Figure 6:
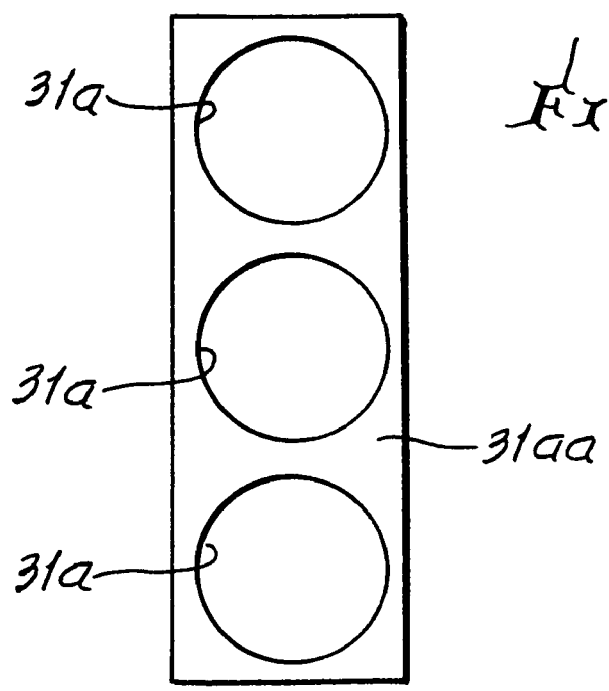
FIG. 6 shows turbine structure to selectively receive different nozzle.

FIG. 6 shows a cluster of bores 31a in turbine structure 31aa to removably and selectively receive selected nozzles, having different fluid flow configurations.

Figure 7:
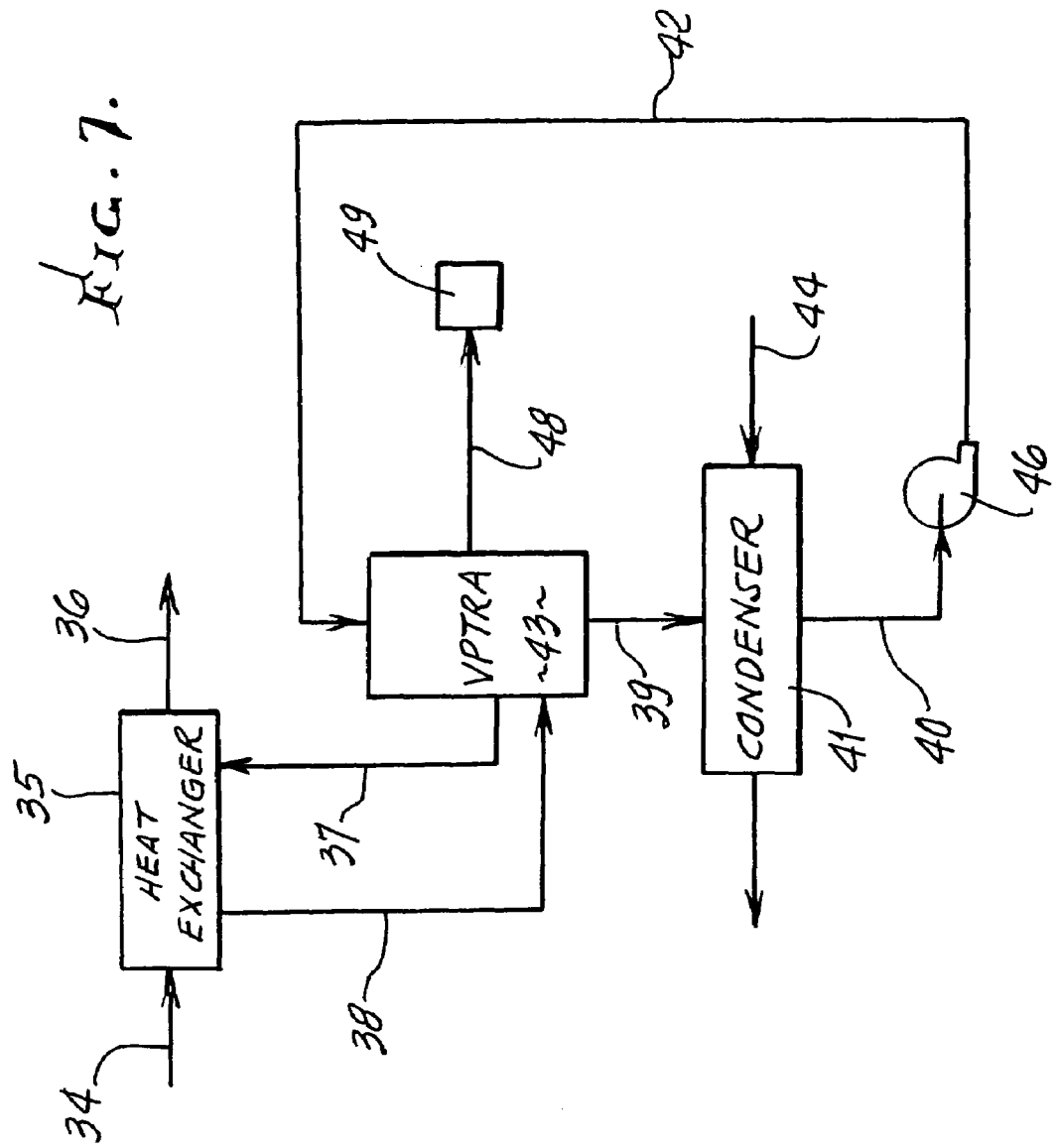
FIG. 7 shows a power system incorporating the invention.

A power system incorporating VPTRA is shown in FIG. 7. This power system uses a geothermal heat source. Other heat sources may be used to supply heat energy for the identical power system described. Hot geothermal fluid 34 flows into a heat exchanger 35. Heat is transferred from the geothermal fluid to the working fluid, in this case a liquid refrigerant R134a, which enters the heat exchanger at 37. After transferring heat the cooler geothermal fluid leaves the heat exchanger at 36.

The heated working fluid flows at 38 into the VPTRA 43, corresponding to point 1 of FIG. 1. After producing power in the VPTRA, the fluid leaves in the vapor state at 39. It enters a condenser 41, where it is condensed to liquid, cooled by cooling water 44, or cooling air.

The condensed fluid leaves the condenser at 40, and has its pressure increased by a boost pump 46. The fluid flows at 42 back into the VPTRA, corresponding to point 21 of FIG. 1. The pressure of the fluid is increased further by the VPTRA pump 20 of FIG. 1. The fluid cools the generator and lubricates the bearings in the VPTRA, before leaving and flowing at 37, to the heat exchanger 35, closing the circuit of the fluid. Power generated by the fluid is transferred at 48 from the VPTRA to an electrical load 49.

For the system shown, the heat exchanger can be a liquid to liquid heat exchanger, reducing the size, cost and pinch point limitations of a vaporizer, which is used in conventional binary geothermal systems. For a brine temperature of 260° F., refrigerant R134A can be used, which enters the heat exchanger as a liquid and leaves as a supercritical fluid. Expansion in a vapor nozzle insert 32, of FIG. 2, results in an efficient expansion producing a high velocity vapor stream to drive the turbine rotor of the VPTRA.

At a higher brine temperature of 300° F., refrigerant R245fa can be used. This results in the fluid entering and leaving the heat exchanger in a liquid state. The liquid is flashed in a two-phase nozzle insert 28 of FIG. 2, resulting in a high efficiency expansion producing a high velocity two-phase stream to drive the turbine rotor of the VPTRA.

Thus, the unexpected result of the invention is that a single seal-less turbine-generator-pump assembly can be used for a wide range of geothermal or other heat source temperatures to generate power with an efficient replacement of the nozzle inserts and blades. This results in a great savings in engineering and design costs and enables the advantages of a liquid-liquid-heat exchanger to be realized for a wide range of temperatures.

We claim:

1. An axial flow turbine with a continuous shroud means for turbine blades, and nozzle means for providing either of at least two nozzle configurations, for respectively receiving flow of fluid in the form of at least two of the following,
   i) gas,
   ii) liquid,
   iii) a gas and liquid mixture, thereby producing a jet directed at the blades, the nozzle means having at least one of the following configurations,
      i) relatively long contour diverging from a throat, and a perforated plate upstream from the throat, ii) a relatively short contour diverging from a throat, and an inlet section of relatively large area, iii) a short contour divergent from a throat.

2. The combination of claim 1 with replaceable blade means.

3. The combination of claim 1 with a rotor and shaft means supported by bearing means lubricated by the fluid, to produce rotation of the shaft and torque exerted on the shaft.

4. The combination of claim 3 with a generator means attached to the shaft means to produce electric power from the rotation and torque of the shaft means.

5. The combination of claim 4 with a pump means operatively connected to the shaft means to produce an increase in pressure of a liquid.

6. The combination of claims 4 including said liquid which is the same liquid as produces said jet.

7. The combination of claim 5 wherein the pumped liquid flows to cool the generator means and lubricate the bearing means.

8. A power system incorporating the turbine of claim 1, and wherein liquid discharged from the blades has a return path for use in the system.

9. The combination of claim 8 wherein the system includes liquid to liquid heat exchanger.

10. The combination of claim 8 and a gas liquid to liquid heat exchanger.

11. The combination of claim 8 and a mixture of gas and liquid to liquid heat exchanger.

12. The combination of claim 8 and a heat exchanger where the heated fluid leaves the heat exchanger in the supercritical state.

13. The combination of claim 8 and a heat exchanger where the heated fluid leaves the heat exchanger as a mixture of gas and liquid.

14. The combination of claim 8 and a source of heat from geothermal fluid, transferred to said liquid.

15. The combination of claim 8 and a source of heat from exhaust gas from an engine, transferred to said liquid.

16. The combination of claim 8 and a source of heat from exhaust gas from a flare or incinerator, transferred to said liquid.

17. The combination of claim 8 and a source of heat from a hot liquid, transferred to said first mentioned liquid.

18. An axial flow turbine with a continuous circumferential shroud means and a nozzle means using a mixture of liquid and gas to produce forces acting on turbine blade means; having a rotor and shaft means supported by bearing means to product rotation of the shaft and torque on the shaft; with a generator means attached to the shaft to produce electric power; with a liquid means to cool the generator and lubricate the bearings having no external rotating seals.

19. Rotary machinery, comprising
   a) an axial flow turbine having nozzle means to receive first fluid flow along a first path to drive turbine blades for rotating a shaft, said path having a first exit,
   b) a driven structure rotatable by said shaft and having bearings,
   c) pump means associated with the driven structure to effect second fluid flow along a second path having a second exit, for lubricating said bearings, said second path disjunct from said first path,
   d) said nozzle means including at least two nozzle configurations, for respectively receiving said first flow in the form of at least two of the following:
      i) gas
      ii) liquid
      iii) a gas and liquid mixture,
   e) a selected one or two of said nozzle configurations installed at said turbine.

20. The rotary machinery of claim 19 wherein said nozzle configurations are selected from the group that includes
   $x_1$) a first nozzle having a relatively long flow contour section diverging lengthwise away from a throat, and a perforated fluid distribution plate upstream of the throat,
   $x_2$) a relatively short flow contour section lengthwise away from a throat, and an inlet section of relatively large area,
   $x_3$) a relatively short flow contour convergent lengthwise away from a throat.

21. The rotary machinery of claim 19 wherein said driven structure comprises one of the following:
   $x_1$) an electrical generator adjacent said second path, for cooling,
   $x_2$) other power means.

22. The rotary machinery of claim 21, wherein said generator is adjacent the turbine, and a seal seals off between said first and second flow paths.

23. The rotary machinery of claim 19 wherein second fluid is cooled by said first fluid in a heat exchanger, before supply to said first path.

24. The rotary machinery of claim 19 including a condenser receiving said first fluid in vapor state, for condensing said first fluid to liquid state, said first fluid then flowing to said second path in the form of said second fluid.

25. The method of operating a turbine to which first or second fluids is supplied to one or more turbine nozzles operating to jet fluid at turbine blades, including
   a) operating the turbine using a first nozzle, efficiently compatible with a first fluid,
   b) removing said first nozzle and installing a second nozzle as a replacement, and which is efficiently compatible with a second fluid,
   c) then operating the turbine using said second nozzle,
   d) said first and second nozzles having different flow configurations.

* * * * *